Oct. 21, 1941.　　　J. O. ROBERTS　　　2,259,662
WOOD SURFACE SCRAPER
Filed Dec. 11, 1939　　　2 Sheets-Sheet 1

J. O. Roberts
INVENTOR.
BY *Knowles*
ATTORNEYS.

Oct. 21, 1941.    J. O. ROBERTS    2,259,662
WOOD SURFACE SCRAPER
Filed Dec. 11, 1939    2 Sheets-Sheet 2

J. O. Roberts
INVENTOR.
BY *CHKnowles*
ATTORNEYS.

Patented Oct. 21, 1941

2,259,662

UNITED STATES PATENT OFFICE 2,259,662

WOOD SURFACE SCRAPER

Julius O. Roberts, Kansas City, Mo.

Application December 11, 1939, Serial No. 308,697

2 Claims. (Cl. 30—171)

This invention relates to scraping tools designed for use in scraping wood surfaces, such as floors, meat blocks or the like.

The primary object of the invention is to provide a scraper embodying a curved scraper blade whereby the blade will have a shearing action, as it is drawn over the surface under treatment, thereby providing a scraper which will effectively accomplish the purpose for which it has been designed.

An important object of the invention is to provide a scraper constructed in such a way that it may be held in one hand and moved across the surface under treatment, while pressure is being directed to the tool by the other hand pressing on the body portion.

Still another important object of the invention is to provide a scraper having a stationary plate and a movable plate, the scraping blade being removably held between the plates in such a way as to insure against the blade moving with respect to the plates, when the scraper is in use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
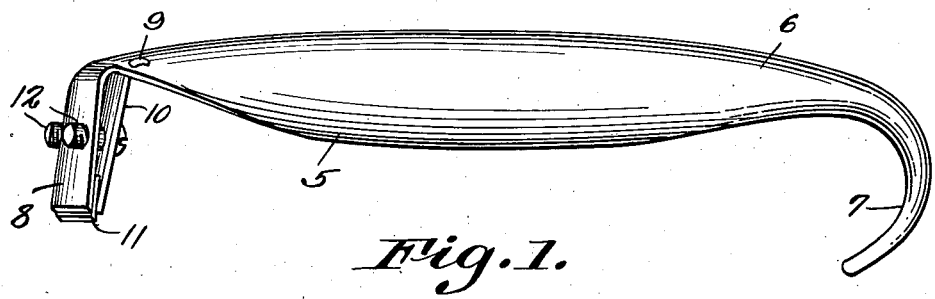
Figure 1 is a side elevational view of a scraping tool constructed in accordance with the invention.
Figure 2:
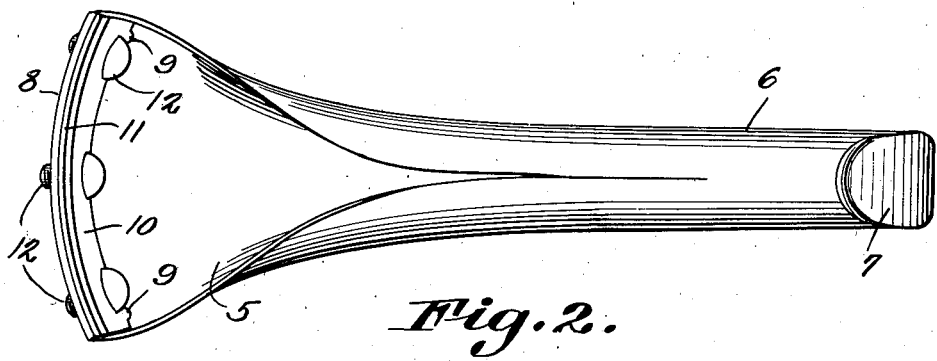
Figure 2 is a bottom view thereof.
Figure 3:
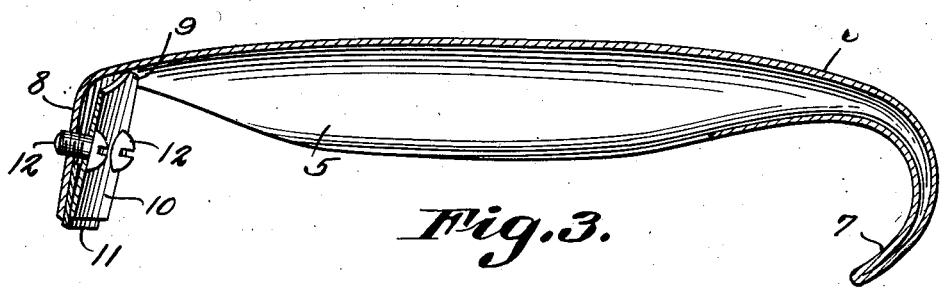
Figure 3 is a longitudinal sectional view through the scraper.
Figure 5:
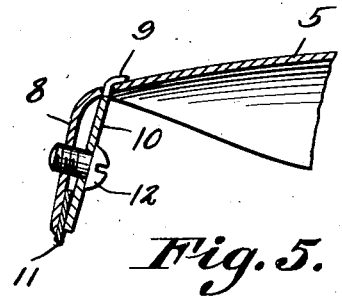
Figure 5 is a sectional view taken on line 5—5 of Figure 4.
Figure 4:
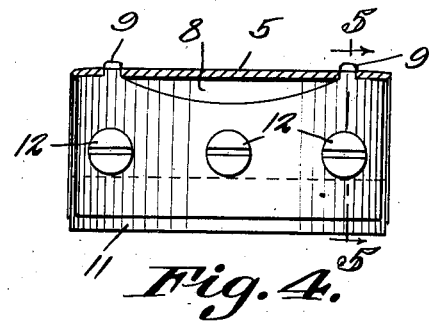
Figure 4 is a transverse sectional view through the scraper, taken at a point adjacent to the blade thereof.

Referring to the drawings in detail, the scraper comprises a body portion indicated generally by the reference character 5, the body portion being preferably constructed of a length of sheet metal material shaped to provide a handle 6 terminating in a hook 7 so that the tool may be readily fitted in the hand of the operator, to move the scraper over the surface under treatment.

One end of the body portion is extended at right angles, providing a plate 8, the plate 8 being slightly curved transversely of its length. As shown, the body portion is formed with openings to accommodate the fingers 9 of the movable plate 10 that cooperates with the plate 8 in clamping the scraping blade, which in the present showing is indicated by the reference character 11. Openings are provided in the movable plate 10 for the reception of the securing screws 12 that are shown as having their threaded ends positioned in threaded openings formed in the plate 8, whereby the plate 10 may be drawn towards the plate 8. It will of course be understood that the blade is constructed of tempered steel and is capable of bending and conforming to the curvature of the plates 8 and 10 with the result that the blade will have a shearing action when drawn over a surface being scraped.

Figure 6:
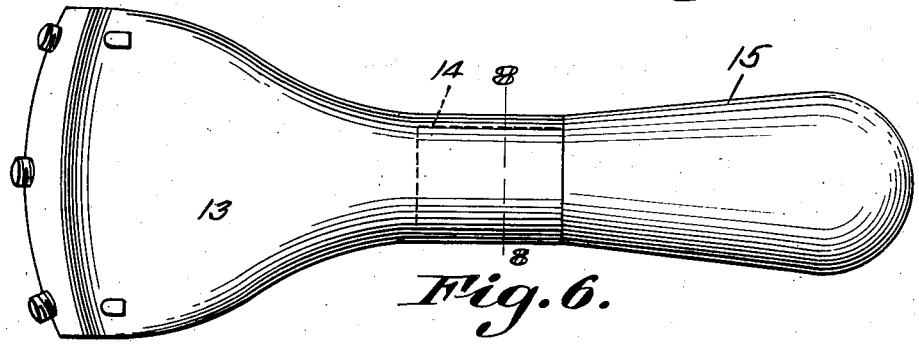
Figure 6 is a plan view of a modified form of the invention.
Figure 7:
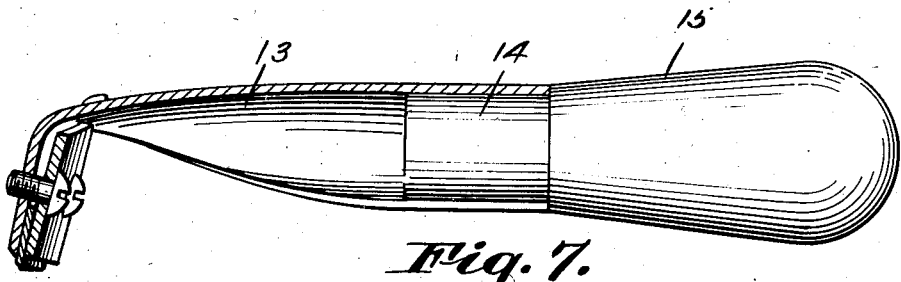
Figure 7 is a longitudinal sectional view through the modified form of scraper.
Figure 9:
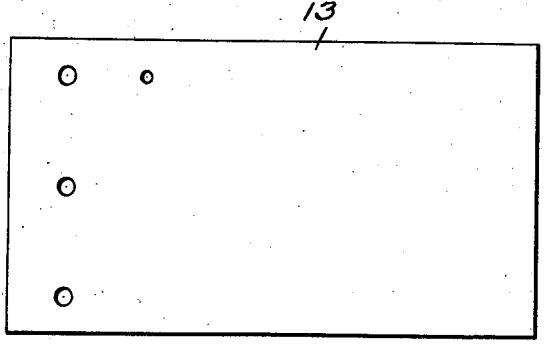
Figure 9 is a view illustrating the blank from which the body portion of the scraper is formed.
Figure 8:
Figure 8 is a sectional view taken on line 8—8 of Figure 6.

In the form of the invention as shown by Figure 6 of the drawings, the body portion which is indicated at 13, is formed by shaping a length of sheet metal material to provide a socket in one end thereof. The socket accommodates the reduced end 14 of the wooden handle 15, which is driven into the socket. In this form of the invention, the resiliency of the metal of which the body portion is formed, is relied on for gripping the reduced end 14 of the handle 15 securely holding the handle in position.

When using the scraper, the scraper is gripped in one hand, the opposite hand being placed on the wide portion of the handle, adjacent to the blade. As the scraper is moved over the surface, it will be obvious that a shearing action takes place and the surface may be effectively scraped.

What is claimed is:

1. A scraping tool comprising a body portion constructed of a length of sheet metal material formed into a hollow handle, substantially circular in cross-section, a transversely curved stationary plate formed integral with the body portion and disposed at one end thereof, said stationary plate extending at substantially right angles to the body portion, said body portion having openings spaced an appreciable distance from said plate, a curved movable plate, fingers formed on the curved movable plate and extended through said openings, said movable plate being inclined towards the free edge of the stationary plate, a scraping blade clamped between the stationary plate and free edge of the movable plate, and screws extending through the plate, and adapted to draw the free edge of the movable plate into clamping relation with the scraping blade, securing the scraping blade to the body portion.

2. A scraping tool comprising a body portion constructed of a length of sheet metal material formed into a hollow handle substantially circular in cross-section, one end of the handle being curved laterally, providing a hook to be engaged by the hand of the operator, the opposite end of the body portion extending at right angles providing a stationary plate, a movable plate, said body portion having spaced openings disposed an appreciable distance from the right angled end of the body portion, fingers extending from the movable plate and disposed within the openings, the opposite edge of the movable plate cooperating with the right angled portion of the body portion in clamping a blade therebetween, and said plate being curved curving the scraping blade held between the plates, and means for securing the movable plate to the right angled portion of the body portion.

JULIUS O. ROBERTS.